(12) United States Patent
Kishi

(10) Patent No.: US 6,304,880 B1
(45) Date of Patent: Oct. 16, 2001

(54) AUTOMATED RECLAMATION SCHEDULING OVERRIDE IN A VIRTUAL TAPE SERVER

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/989,501

(22) Filed: Dec. 12, 1997

(51) Int. Cl.$^7$ .................................................. G06F 17/30
(52) U.S. Cl. .......................... 707/200; 707/205; 711/114
(58) Field of Search .................................. 707/200, 206, 707/205, 100–101; 711/114

(56) References Cited

U.S. PATENT DOCUMENTS

| | | | |
|---|---|---|---|
| 4,667,421 | * 5/1987 | White | 711/118 |
| 4,814,971 | 3/1989 | Thatte | 707/206 |
| 4,853,842 | 8/1989 | Thatte et al. | 369/34 |
| 4,989,134 | * 1/1991 | Shaw | 707/206 |
| 5,008,786 | 4/1991 | Thatte | 707/206 |
| 5,088,036 | 2/1992 | Ellis et al. | 711/162 |
| 5,287,459 | 2/1994 | Gniewek | 707/206 |
| 5,398,142 | * 3/1995 | Davy | 360/48 |
| 5,438,674 | * 8/1995 | Keele et al. | 711/4 |
| 5,475,834 | * 12/1995 | Anglin et al. | 707/206 |
| 5,485,613 | 1/1996 | Engelstad et al. | 714/15 |
| 5,613,082 | * 3/1997 | Brewer et al. | 711/360 |
| 5,664,146 | * 9/1997 | Bolin et al. | 711/115 |
| 5,805,864 | * 9/1998 | Carlson et al. | 395/500 |
| 5,808,821 | * 9/1998 | Davy | 360/48 |
| 5,809,511 | * 9/1998 | Peake | 707/204 |
| 5,845,297 | * 12/1998 | Grimsrud et al. | 707/205 |

* cited by examiner

Primary Examiner—Hosain T. Alam
Assistant Examiner—Jean Bolte Fleurantin
(74) Attorney, Agent, or Firm—Altera Law Group, LLC

(57) ABSTRACT

An automated reclamation scheduling system and method are taught for managing storage reclamation on a virtual tape server. Where reclamation-off times are set by a user, an automated administrator may override the settings depending on the number of scratch tapes that are available. The fewer scratch tapes that remain available, the more frequently storage reclamation will be performed in the reclamation schedule set by the automated administrator.

28 Claims, 3 Drawing Sheets

AUTOMATED RECLAMATION SCHEDULING OVERRIDE IN A VIRTUAL TAPE SERVER

BACKGROUND OF THE INVENTION

1. Field of the Invention

This invention relates in general to data storage and processing, and more particularly reclamation of data storage space.

2. Description of Related Art

In hierarchical computer storage systems, intensively used and fast memories are paired with arrays of slower and less frequently accessed data devices. One example of high-speed, expensive memory is a direct access storage device file buffer (DASD). Slower memory devices include tape drives and disk drive arrays, which are less expensive than a DASD.

One such hierarchical storage system is a virtual tape storage system (VTS). A VTS includes an array of tape devices, for example, an IBM® 3590 tape cartridge. During operation, the VTS is writing data from a host to the numerous tape devices on the system. Eventually, many of the volumes of data expire, and will not be accessed in the future. A volume may expire because an expiration time or date was assigned to the volume at creation, or a volume may expire because the volume is replaced by a more recent version stored on the system. As volumes expire, some tapes are left containing only a small fraction of data that is still current. Therefore, many computer storage systems perform a periodic reclamation process. A reclamation process is used to clear out storage space that contains only a few current files, consolidating those files in another location, leaving the tapes to be assigned as a scratch tape to receive new data. After current files are copied to a new location, a storage manager is updated as to the new locations of the volumes. Now, the tapes can be written over with entirely new data.

Reclamation processes and systems are also called garbage collectors, especially when referring to systems that consolidate storage space in object-oriented program-controlled systems.

A common garbage collector uses a mark phase to mark all objects that should be saved from the storage space. Then, all objects are sequentially examined in a sweep phase. Objects that are not marked are deleted and objects that are marked are unmarked and saved. This marked/sweep garbage collector stops all other activity while it is running. The time required for the mark/sweep garbage collector to complete its tasks is significant and unpredictable. Therefore, this type of mark/sweep garbage collector is difficult to use with systems that have real-time constraints. The uncontrolled time delay while the garbage collector runs is unacceptable.

One way to address the problem of conflicts with customer use of data and reclamation processing is to increase the speed of the reclamation process. However, conflicts still arise between the operation demands and the reclamation demands even when the time of reclamation processing is shortened.

One method for automatic memory reclamation within an object-oriented system reduces the number of conflicts by making reclamation processing time more predictable. Within this system, reclamation tasks are broken up into cycles that are equal to a predetermined amount of time. Each task comprises a non-decomposable task that can be performed within the predetermined amount of time. Thus, the scheduling of the task segments is controlled, so that garbage collection is less obtrusive to the system.

One problem with this system is that it does not take into account the amount of remaining storage space. If available storage space is exhausted while a customer program is running, the program will fail. It is important that reclamation processing keeps up with the demand for new storage space, in order to prevent the failure of programs. It is more preferable that the program operation is delayed by reclamation processing than that the program crashes due to lack of storage space.

The virtual tape system includes a library manager that allows the customer to set times during which reclamation does not occur. This allows the customer to prioritize certain activities that they do not wish to be delayed by reclamation activities. However, excessive interference between the reclamation processing and customer VTS usage can occur.

It can be seen that there is a need for automated reclamation scheduling that takes into account the amount of remaining available storage space in a virtual tape server. It can also be seen that there is a need for a system that is capable of overriding customer reclamation time preferences, in order to ensure that operation will continue smoothly.

SUMMARY OF THE INVENTION

To overcome the limitations in the prior art described above, and to overcome other limitations that will be apparent upon reading and understanding the present specification, the present invention discloses a method for managing reclamation scheduling and a system for storage reclamation management.

The method of the present invention is for managing storage reclamation on a virtual tape server having a plurality of tape devices, a library manager, and a number of scratch tapes. The method includes the steps of receiving reclamation-off time from the library manager, determining a number of scratch tapes, and setting a reclamation schedule dependent on the number of scratch tapes. The reclamation schedule may be set by overriding the reclamation-off time to perform frequent reclamations when the number of tapes is below a first threshold. The schedule may also be determined by performing reclamation according to the reclamation-off times, when the number of tapes is at or above the first threshold and below a second threshold. Additionally, if the number of tapes is at or above the second threshold, so that ample storage space is available, reclamation may be performed according to the reclamation-off times when the VTS is not occupied.

A storage reclamation management system on a virtual tape server is also described herein. The system includes a plurality of tape devices, a library manager that has a setting for reclamation-off times, and a storage manager that includes a reclamation subsystem that operates on a reclamation schedule depending on the number of scratch tapes available.

These and other advantages and features of novelty which characterize the invention are pointed out with particularity in the claims annexed hereto and form a part of this application. However, for a better understanding of the invention, its advantages, and the objects obtained by its use, reference should be made to the drawings which form a further part of this application, and to accompanying descriptive matter in which there are illustrated and described specific examples of an apparatus in accordance with the invention.

BRIEF DESCRIPTION OF THE DRAWINGS

Referring to the drawings in which like reference numbers represent corresponding art throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
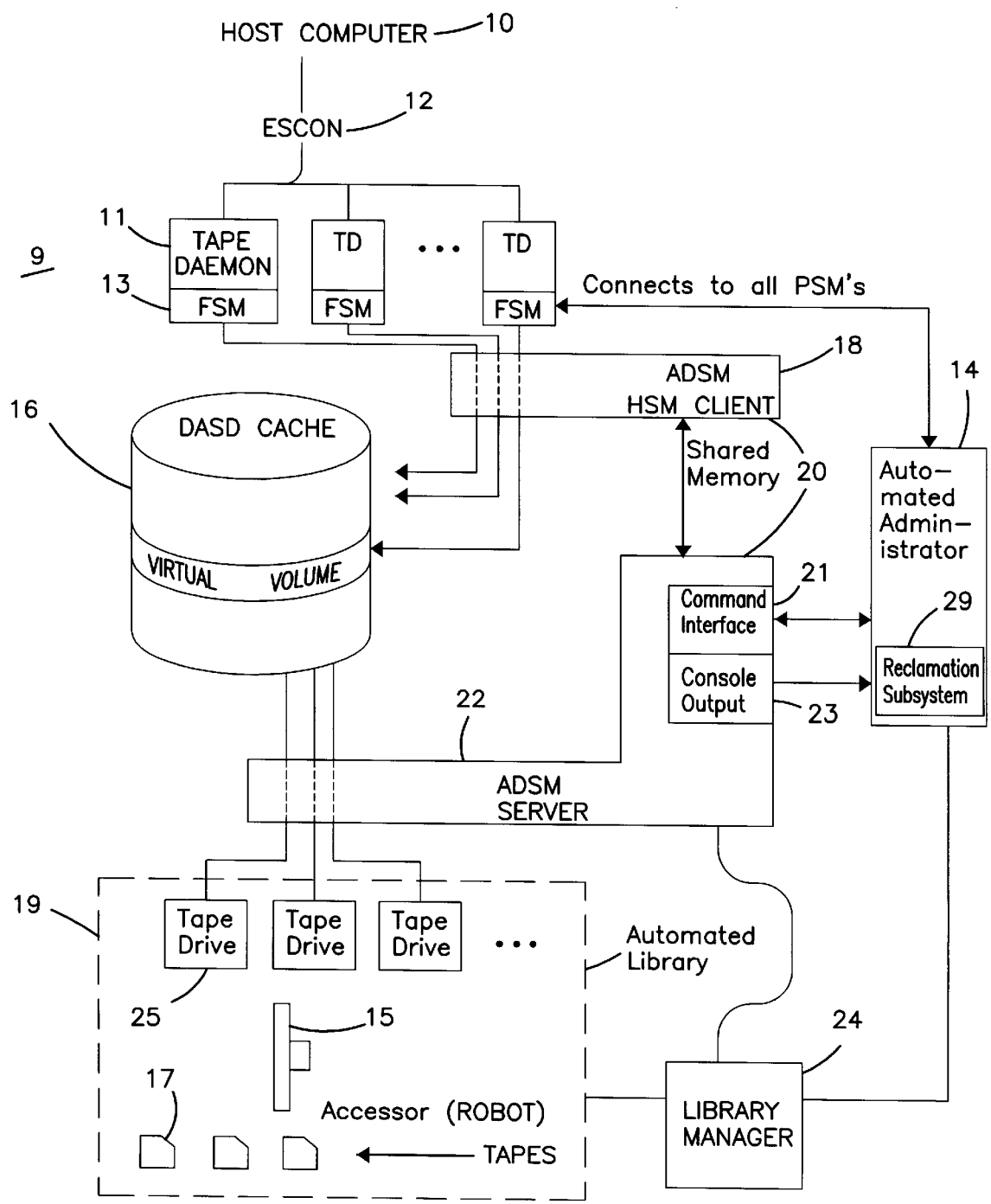
FIG. 1 is a block diagram showing a virtual tape server system for automated reclamation scheduling override.

Now referring to FIG. 1, a virtual tape server (VTS) 9 is pictured, operatively coupled to a host computer 10. The host computer communicates with a host-to-data interface 12 within the virtual tape server. The host-to-data interface 12, such as IBM's Enterprise Systems Connection (ESCON), may be a fiber optic local area network used to link mainframes to disk drives or other mainframes. From the host computer 10, tape daemons 11 may appear to be multiple tape devices attached to the host-to-data interface, or ESCON, 12. The VTS 9 also includes a direct access storage device (DASD) cache 16, a plurality of tape devices 25 within an automated library 19, and a storage manager 20. One example of a tape device that could be used is IBM 3590 tape cartridge. Within the automated library 19, an accessor 15, or robot, puts tapes 17 into one of the tape drives 25 when a tape is requested.

The storage manager 20, such as the Adstar® Distributed Storage Manager (ADSM) by IBM, is in control of moving data from the DASD to tapes 17. The storage manger 20 may include an ADSM server 22 and an ADSM hierarchical storage manager client 18. Alternatively, the server 22 and client 18 could each be an ADSM system. The storage manager may further include a command interface 21 and a console output 23.

A VTS automated administrator 14, such as an automated ADSM administrator for the VTS, is the component responsible for the automated reclamation scheduling of the present invention, which may provide intelligent resource allocation between normal operation and reclamation activity. A reclamation subsystem 29 may carry out these functions within the automated administrator 14. The automated administrator 14 controls the operations of the DASD 16 through the hierarchical storage manager (HSM) client 18. A library manager 24 communicates with the automated administrator 14. The library manager 24 allows the customer to set times during which reclamation processing does not occur. These reclamation-off times are in turn communicated to the automated administrator 14. The storage manager 20 performs reclamation operations on the tape devices when instructed to by the automated administrator 14.

Typically, the storage manager 20 periodically performs a reclamation operation to return tapes or cartridges that are almost empty to its new storage pool. The automated administrator 14 usually does not allow the storage manager 20 to perform such operations during reclamation-off times that are dictated by the library manager 24. As discussed above, excessive interference may occur between the reclamation processing and the customer usage for customer set reclamation-off times.

In order to prevent failure of operations due to lack of storage space, the automated administrator of the present invention may override the reclamation-off times. The automated administrator 14 overrides reclamation policies set by the library manager 24 based on some internal rules. This process is described in FIG. 2.

Figure 2:
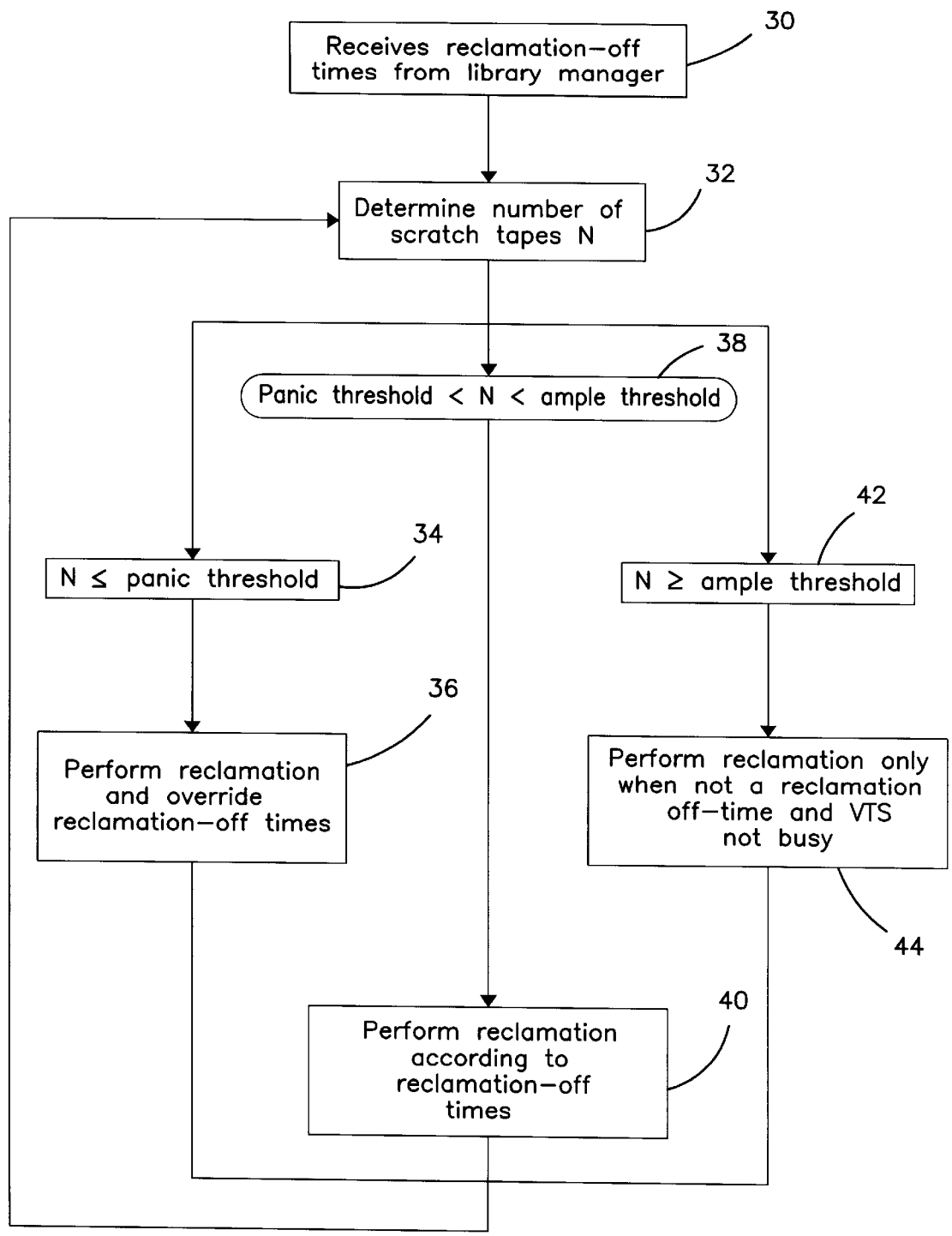
FIG. 2 is a flow chart showing the automated reclamation scheduling of the present invention.

Now referring to FIG. 2, the automated administrator receives reclamation-off times from the library manager that were set by the customer at step 30. The automated administrator then determines how many scratch tapes, N, are currently available at step 32. Two thresholds are set for reclamation based on the number of scratch tapes that the storage manager has available. A panic threshold is determined below which the virtual tape server is considered to be almost out of scratch tape. A second threshold, an ample threshold, is also set, over which the virtual tape server is considered to have an ample supply of scratch tapes. Depending on the number of scratch tapes in relation to these thresholds, the reclamation schedule is determined.

If the number of scratch tapes is at or below the panic threshold at step 34, then reclamation may be performed frequently, overriding the scheduled reclamation-off time, at step 36. In one embodiment, reclamation is performed constantly if the number of tapes is below the panic threshold.

If the number of tapes is greater than the panic threshold but less than the ample threshold at step 38, the automated administrator turns reclamation on and off at the storage manager 20 based on the scheduled reclamation times at step 40. In this case, the reclamation-off times set by the customer are respected.

If the virtual tape server is at or above the ample threshold at step 42, then reclamation is not essential for continued operation. In this case, the automated administrator 14 turns off the reclamation whenever the library manager reclamation-off times indicate that it should be off. The automated administrator may also only turn reclamation on if the library manager time schedule indicates that it should be on and the virtual tape server is not occupied, defined as not being very busy, at step 44. Empirical trials may be used to determine from a simulator what the sufficient level of occupation is for the virtual tape server to be deemed occupied. For example, the criteria for the virtual tape server not being busy may be that two drives are free for a first predetermined time period or that three drives are free for at least a second predetermined time period. The first predetermined time period may be equal to, or greater than, the second predetermined time period. The first and second predetermined time periods may be thirty minutes and twenty minutes, respectively, for example.

The panic threshold and ample threshold may be determined based on the needs of the system. For example, a panic threshold may be ten scratch tapes while the ample threshold may be fifty, over which the VTS is considered to have an ample supply.

Figure 3:
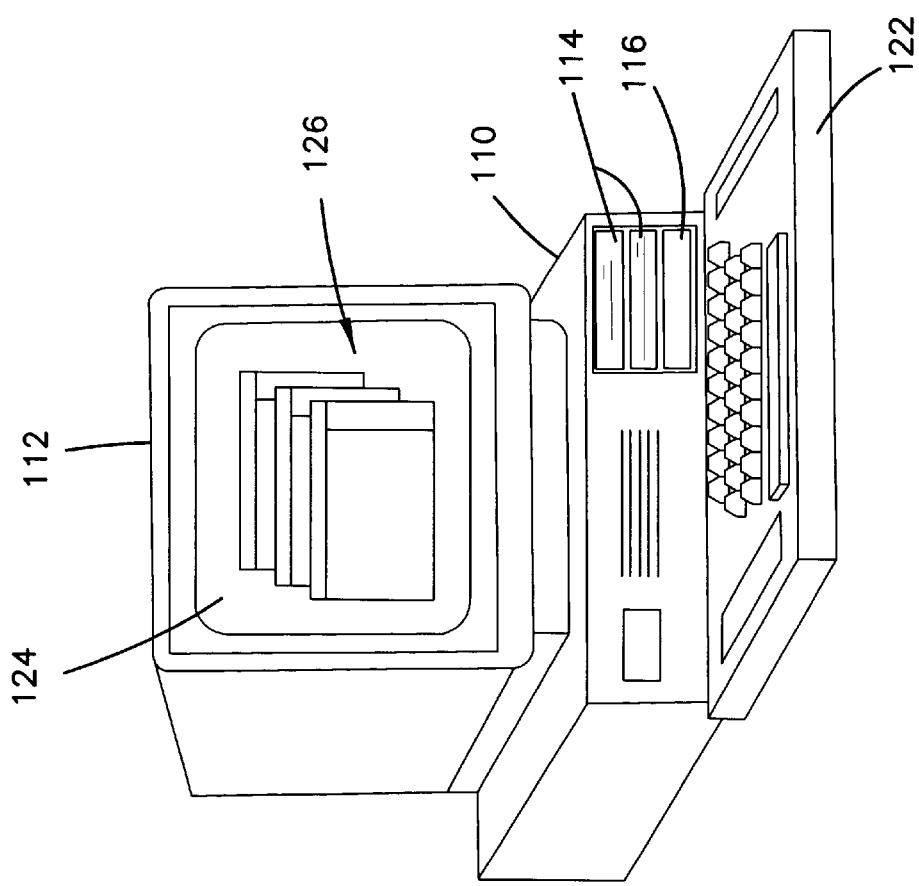
FIG. 3 is a block diagram showing a hardware environment that may be used in conjunction with the present invention.

FIG. 3 is a block diagram that illustrates an exemplary hardware environment of the present invention for managing storage reclamation on a virtual tape server. The present invention is typically implemented using a computer 110 comprised of a microprocessor, random access memory (RAM), read-only memory (ROM), and other standard components. For example, the automated administrator may be a computer 110, or may be controlled by a computer 110. It is envisioned that attached to the computer 110 may be a monitor 112, floppy disk drives 114, CD-ROM drives 116, and other peripherals. Also included in the preferred embodiment may be input devices, for example, a keyboard 122.

The computer 110 operates under the control of an operating system 124, such as the Windows, OS/2, Macintosh, or UNIX operating systems, which is represented in FIG. 3 by the screen display on the monitor 112. The computer 110 executes one or more computer programs 126, which are represented in FIG. 3 by the "windows" displayed on the monitor 112, under the control of the operating system 124. The present invention comprises a storage reclamation management function for a virtual tape server that is preferably implemented in the operating system 124 and/or computer programs 126. Generally, the operating system 124 and the computer programs 126 may be tangibly embodied in a computer-readable medium or carrier, e.g. one or more of the fixed and/or removable data storage devices 114 and 116, or other data storage or data communications devices. Both the operating system 124 and the computer programs 126 may be loaded from the data storage devices 114 and 116 into the random access memory of the computer 116 for execution by the microprocessor as discussed above with reference to FIG. 3. Both the operating system 124 and the computer programs 126 comprise instructions which, when read and executed by the microprocessor of the computer 110, cause the computer 110 to perform the steps necessary to execute the steps or elements of the present invention.

Although an exemplary computer system configuration is illustrated in FIG. 3, those skilled in the art will recognize that any number of different configurations performing similar functions may be used in accordance with the present invention.

It will be understood by those of skill in the art that the embodiments described herein do not limit the following claims. In contrast, many equivalents of the elements described are contemplated and encompassed by this invention.

What is claimed is:

1. A method for managing storage reclamation on a virtual tape server having a plurality of tape devices, a library manager, and a number of scratch tapes, comprising the steps of:

receiving reclamation-off times from the library manager, wherein the reclamation-off times identify periods in which reclamation processing is prohibited;

determining a number of scratch tapes; and setting a reclamation schedule identifying periods in which reclamation processing is permitted and prohibited, wherein the reclamation schedule is a function of the number of scratch tapes that are available and the reclamation-off times.

2. The method of claim 1, wherein the reclamation schedule includes a reclamation frequency, the reclamation frequency being inversely related to the number of scratch tapes.

3. The method of claim 1, wherein setting the reclamation schedule further comprises the steps of:

overriding the reclamation off-times to perform frequent reclamation, when the number of tapes is below a first threshold;

performing reclamation according to reclamation-off times, when the number of tapes is at or above the first threshold and below a second threshold; and performing reclamation according to reclamation-off times when the VTS is not occupied, when the number of tapes is at or above the second threshold.

4. The method of claim 3, wherein the first threshold is ten.

5. The method of claim 3, wherein the second threshold is fifty.

6. The method of claim 3, wherein the virtual tape server is not occupied when two drives are free for a first predetermined time period or three drives are free for a second predetermined time period.

7. The method of claim 6, wherein the first predetermined time period is equal to the second predetermined time period.

8. The method of claim 6, wherein the first predetermined time period is greater than the second predetermined time period.

9. The method of claim 6, wherein the first predetermined time period is 30 minutes and the second predetermined time period is 20 minutes.

10. A storage reclamation management method on a virtual tape server having a plurality of tape devices, a library manager, and a number of scratch tapes, comprising the steps of:

receiving reclamation-off times from the library manager;

determining a number of scratch tapes;

overriding the reclamation off-times to perform frequent reclamation, when the number of tapes is below a first threshold;

performing reclamation according to reclamation-off times, when the number of tapes is at or above the first threshold and below a second threshold; and performing reclamation according to reclamation-off times when the VTS is not occupied, when the number of tapes is at or above the second threshold.

11. A storage reclamation management system on a virtual tape server having a number of scratch tapes, the system comprising:

a plurality of tape devices;

a library manager comprising a setting for reclamation-off times;

an administrator comprising a reclamation subsystem, where the reclamation subsystem operates on a reclamation schedule that depends on the number of scratch tapes.

12. The system of claim 11 wherein the library manager setting for reclamation-off times is entered by a customer.

13. The system of claim 11, wherein the reclamation schedule includes a reclamation frequency, the reclamation frequency being inversely related to the number of scratch tapes.

14. The system of claim 11 wherein the reclamation subsystem:

overrides the reclamation off-times to perform frequent reclamation, when the number of tapes is below a first threshold, performs reclamation according to reclamation-off times, when the number of tapes is at or above the first threshold and below a second threshold, and performs reclamation according to reclamation-off times when the VTS is not occupied, when the number of tapes is at or above the second threshold.

15. The system of claim 14, wherein the virtual tape server is not occupied when two drives are free for a first predetermined time period or three drives are free for a second predetermined time period.

16. The system of claim 15, wherein the first predetermined time period is equal to the second predetermined time period.

17. The system of claim 15, wherein the first predetermined time period is greater than the second predetermined time period.

18. The system of claim 15, wherein the first predetermined time period is 30 minutes and the second predetermined time period is 20 minutes.

19. An article of manufacture comprising a program storage medium readable by a computer having a memory, the medium tangibly embodying one or more programs of instructions executable by the computer to perform method steps for managing storage reclamation on a virtual tape server having a plurality of tape devices, a library manager, and a number of scratch tapes, the method comprising the steps of:

receiving reclamation-off times from the library manager, wherein the reclamation-off times identify periods in which reclamation processing is prohibited;

determining a number of scratch tapes that are available; and setting a reclamation schedule identifying periods in which reclamation processing is permitted and prohibited, wherein the reclamation schedule is a function of the number of scratch tapes that are available and the reclamation-off times.

20. A method for performing reclamation scheduling in an external storage system, the external storage system coupled to a host processing system to provide external storage capabilities for the host processing system, the method comprising:

defining one or more predetermined reclamation-off times during which reclamation processing of the external storage system is prohibited;

performing reclamation processing of the external storage system at times other than the reclamation-off times;

overriding the predetermined reclamation-off times based on predetermined conditional criteria such that reclamation processing occurs during the predetermined reclamation-off times in response to the predetermined conditional criteria.

21. The method of claim 20, further comprising determining a number of scratch tapes available to receive new data from the host processing system, and wherein overriding the predetermined reclamation-off times based on predetermined conditional criteria comprises overriding the predetermined reclamation-off times based on the number of scratch tapes available to receive new data.

22. The method of claim 21, wherein overriding the predetermined reclamation-off times based on the number of scratch tapes available comprises overriding the predetermined reclamation-off times when the number of scratch tapes available is below a predetermined threshold indicative of an unacceptably low number of available scratch tapes.

23. The method of claim 22, wherein overriding the predetermined reclamation-off times when the number of scratch tapes available is below a predetermined threshold comprises repeatedly overriding the predetermined reclamation-off times when the number of scratch tapes available is below the predetermined threshold until the number of scratch tapes available is no longer below the predetermined threshold.

24. The method of claim 20, further comprising determining whether to perform reclamation processing of the external storage system at times other than the reclamation-off times, or whether to override the predetermined reclamation-off times, based on the predetermined conditional criteria.

25. The method of claim 24, wherein the predetermined conditional criteria comprises a number of scratch tapes available to receive new data from the host processing system.

26. The method of claim 25, wherein performing reclamation processing of the external storage system at times other than the reclamation-off times comprises performing the reclamation processing while the number of scratch tapes available to receive new data is within a first range of numbers of available scratch tapes.

27. The method of claim 25, wherein overriding the predetermined reclamation-off times comprises overriding the predetermined reclamation-off times while the number of scratch tapes available to receive new data is within a second range of numbers of available scratch tapes, thereby allowing reclamation processing during the predetermined reclamation-off times.

28. The method of claim 25, further comprising:

determining whether the number of scratch tapes available to receive new data is within a third range of numbers of available scratch tapes indicative of an acceptably ample number of available scratch tapes;

determining whether the external storage system is within a reclamation-off time;

determining whether the external storage system is being occupied at a predefined low occupation level; and performing reclamation processing when the number of scratch tapes available to receive new data is within the third range, the reclamation processing is not within the reclamation-off time, and the external storage system is being occupied at the predefined acceptably low occupation level.

* * * * *

UNITED STATES PATENT AND TRADEMARK OFFICE
CERTIFICATE OF CORRECTION

PATENT NO. : 6,304,880 B1
DATED : October 16, 2001
INVENTOR(S) : Kishi

It is certified that error appears in the above-identified patent and that said Letters Patent is hereby corrected as shown below:

<u>Title page,</u>
Item [56], References Cited,
Replace "4,667,421" with -- 4,467,421 --.
Replace "5/1987" with -- 8/1984 --.

Signed and Sealed this

Nineteenth Day of November, 2002

Attest:

JAMES E. ROGAN
Attesting Officer
Director of the United States Patent and Trademark Office